US006662010B1

United States Patent
Tseitlin et al.

(10) Patent No.: US 6,662,010 B1
(45) Date of Patent: Dec. 9, 2003

(54) METHOD AND SYSTEM FOR PROVIDING INTEGRATED SERVICES IN A MOBILE RADIO COMMUNICATION SYSTEM

(75) Inventors: Eugene Tseitlin, Buffalo Grove, IL (US); Barry Kogan, Arlington Heights, IL (US); Anatoly Agulnik, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 401 days.

(21) Appl. No.: 09/703,046

(22) Filed: Oct. 31, 2000

(51) Int. Cl.[7] ................................................. H04Q 7/20
(52) U.S. Cl. .................... 455/426.1; 455/450; 455/515; 455/518
(58) Field of Search ................................. 455/550, 552, 455/517, 507, 422, 518, 426.1, 428, 433, 435, 445, 463, 508, 521, 412, 560, 563, 450, 515

(56) References Cited

U.S. PATENT DOCUMENTS

| 4,893,270 A | 1/1990 | Beck et al. |
| 5,367,566 A | 11/1994 | Moe et al. |
| 5,404,396 A | 4/1995 | Brennan |
| 5,822,539 A | 10/1998 | Van Hoff |
| 6,134,450 A | * 10/2000 | Nordeman .................. 455/517 |
| 6,138,030 A | * 10/2000 | Coombes et al. ........... 455/507 |
| 6,292,781 B1 | * 9/2001 | Urs et al. .................... 455/553 |

FOREIGN PATENT DOCUMENTS

| EP | 0 748 137 A2 | 12/1996 |
| WO | WO 95/10152 A1 | 4/1995 |

OTHER PUBLICATIONS

WO 95/10152 (PCT/US94/09306), Apr. 13, 1995, Krebs et al.*
Giner, V. et al. "Dispatch Versus Interconnect Traffic: A Comparative Analysis in a Land Mobile Trunking System". WINLAB, Rutgers, the State University of New Jersey. IEEE 1996, pp 242–246.

* cited by examiner

Primary Examiner—Nay Maung
Assistant Examiner—John J Lee
(74) Attorney, Agent, or Firm—Jeffrey K. Jacobs

(57) ABSTRACT

A radio communication system (10) that includes a method and call processor (18) for integrating multiple services. The call processor (18) provides a transparent interface between various service subsystems (12–16) to allow inter-service call waiting notification and to improve overall system reliability and performance. A local home location register (HLR) (21) stores mobile subscriber unit status information, permitting the call processor (18) to perform call notification and route calls more efficiently.

21 Claims, 5 Drawing Sheets

METHOD AND SYSTEM FOR PROVIDING INTEGRATED SERVICES IN A MOBILE RADIO COMMUNICATION SYSTEM

TECHNICAL FIELD OF THE INVENTION

The present invention relates generally to radio communication systems, and in particular, to integrating multiple services in a radio communication system.

BACKGROUND OF THE INVENTION

Radio communication systems providing multiple services, such as interconnect and dispatch services, are known. In such multi-service systems, an interconnect service provides an interface to the public switched telephone network (PSTN) permitting calls to be placed between radio mobile subscriber units (MSUs) and conventional telephones using the PSTN.

The dispatch service permits MSUs to communicate with one another using standard dispatch protocols over a shared communication channel. In dispatch subsystems, MSUs are organized into talk groups according to geographic location. Among other things, conventional dispatch services provide for group calls and private calls between MSUs.

A disadvantage of currently available multi-service systems is that interconnect and dispatch services are not fully integrated. This results in a number of limitations. In the case of mobile-to-mobile interconnect calls between MSUs, currently available multi-service systems employ the PSTN and transcoder resources of the interconnect service. Each interconnect call between two MSUs requires two voice processors of the transcoder. This results in a call having a longer set-up time and consuming more system resources.

Another limitation of known multi-service systems is that there is not inter-service notification of MSU statuses. Thus, if a subscriber initiates a dispatch call to an MSU involved in an interconnect call, the dispatch subsystem will simply attempt to page the busy MSU without the ability to notify either the busy MSU or the caller. A similar scenario occurs during an interconnect call request to an MSU involved in a dispatch call. System bandwidth and resources are wasted by paging unreachable MSUs.

The lack of inter-service notification also prevents MSUs in dispatch mode from receiving call waiting notification of incoming interconnect calls, and vice versa.

Another problem with known multi-service systems is that interconnect subsystems and dispatch subsystems are not directly connected. This can negatively affect the overall reliability and performance of the communication system because a failure in one subsystem will not be detected by the other subsystem.

Therefore, a need exists for a multi-service radio communication system that more fully integrates services and subsystems so as to overcome the limitations discussed above.

DETAILED DESCRIPTION OF THE PRESENTLY PREFERRED EMBODIMENTS

Figure 1:
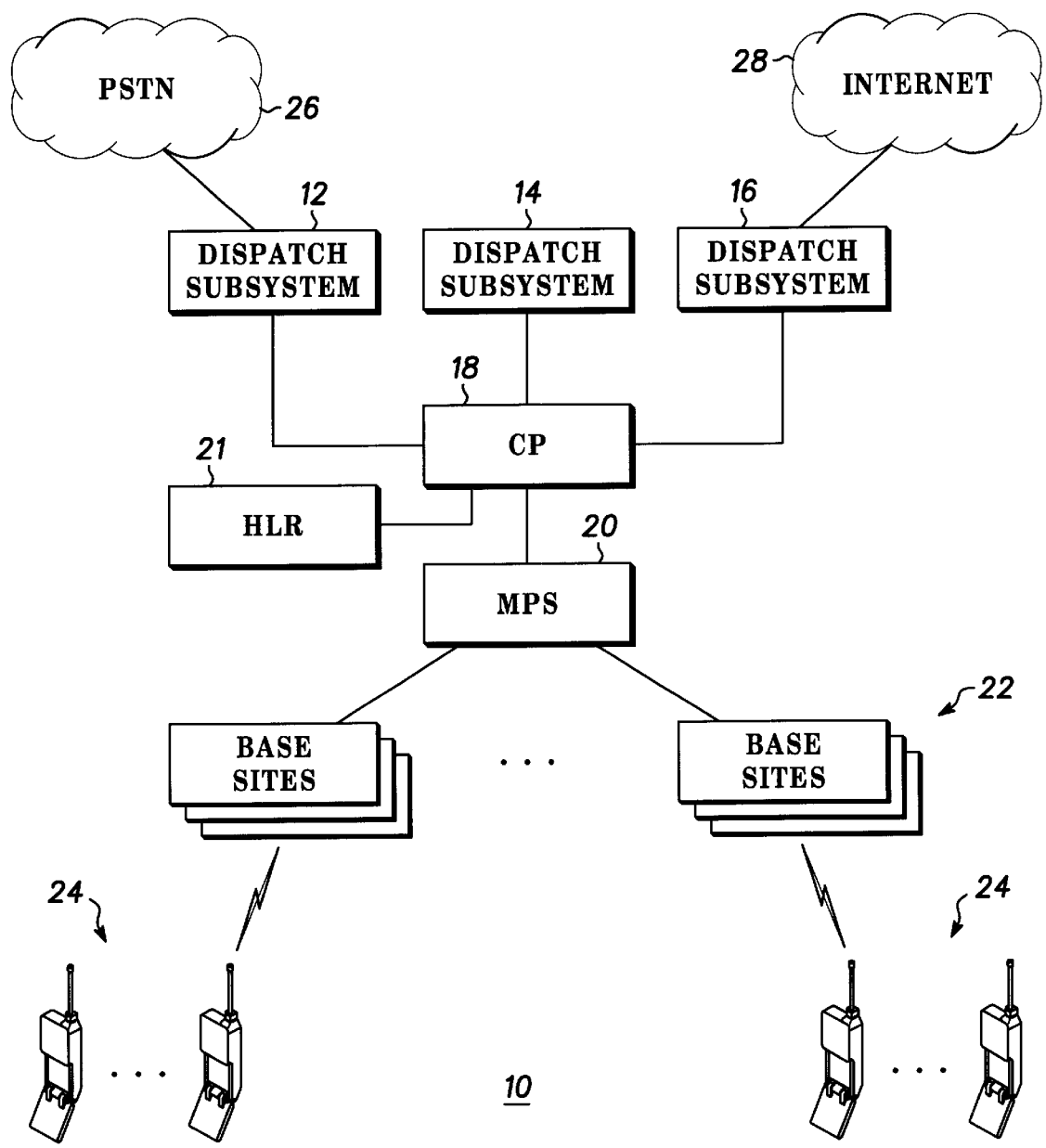
FIG. 1 is a block diagram illustrating an exemplary multi-service radio communication system that integrates various services in accordance with one embodiment of the present invention.

Turning now to the drawings, and in particular to FIG. 1, there is shown an exemplary multi-service radio communication system 10 in accordance with an embodiment of the present invention. The system 10 includes an interconnect subsystem 12, a dispatch subsystem 14, an Internet protocol (IP) subsystem 16, a call processor (CP) 18, a main packet switch (MPS) 20, a plurality of base sites 22 and a plurality of mobile subscriber units (MSUs) 24. The system 10 provides conventional interconnect and dispatch services to the MSUs 24, as well as Internet data packet services by way of the IP subsystem 16. The interconnect subsystem 12 allows the MSUs 24 to communicate by way of the public switch telephone network (PSTN) 26. The interconnect subsystem 12 can include commercially-available interconnect components, such as a mobile switching center (MSC), base site controllers (BSCs), and the like, at least one of which has been configured to interface to the CP 18.

The dispatch subsystem 14 permits the MSUs 24 to communicate using conventional dispatch services, such as those provided by an "iDEN" dispatch processor that is commercially available from Motorola, Inc. The IP subsystem 16 permits the MSUs 24 to communicate by way of the Internet 28. The IP system 16 can include a commercially-available mobile data gateway (MDG), such as one available from Motorola, Inc.

The CP 18 provides a novel interface between the subsystems 12–14 for integrating the interconnect, dispatch, and IP services provided to the MSUs 24. This integration allows inter-service notification of MSU statuses and protocol conversion between the subsystems so that the various subsystems can be alerted to the operational status of the other subsystems. The functionality of the CP 18 can appear to be "transparent" to the subsystems 12–16, i.e., the subsystem components do not need to be modified substantially in order to communicate with and utilize the resources of the CP 18.

To integrate the services, the CP 18 relies on a stand-alone home location register (HLR) 21 to provide MSU status notification. The HLR includes a database of MSUs registered with the system that keeps track of at least the operational states of the MSUs. An operational state of an MSU indicates whether it is involved in an interconnect call, dispatch call or idle. The CP can be configured to periodically update the locations and operational states stored in the HLR 21.

The MSUs 24 can include two-way communication devices such as "iDEN" mobile radios or radio telephones available from Motorola, Inc. The base sites 22 are known in the art and preferably support one or more trunking communication platforms, such as frequency division multiple access (FDMA), time division multiple access (TDMA), code division multiple access (CDMA). Preferably, the base sites 22 include "iDen" enhanced based transceiver sites (ETBS), which are also available from Motorola, Inc.

The routing functionality of the MPS 20 is well known in the art and suitable MPS platforms are commercially available from Cisco, Inc.

Figure 2:
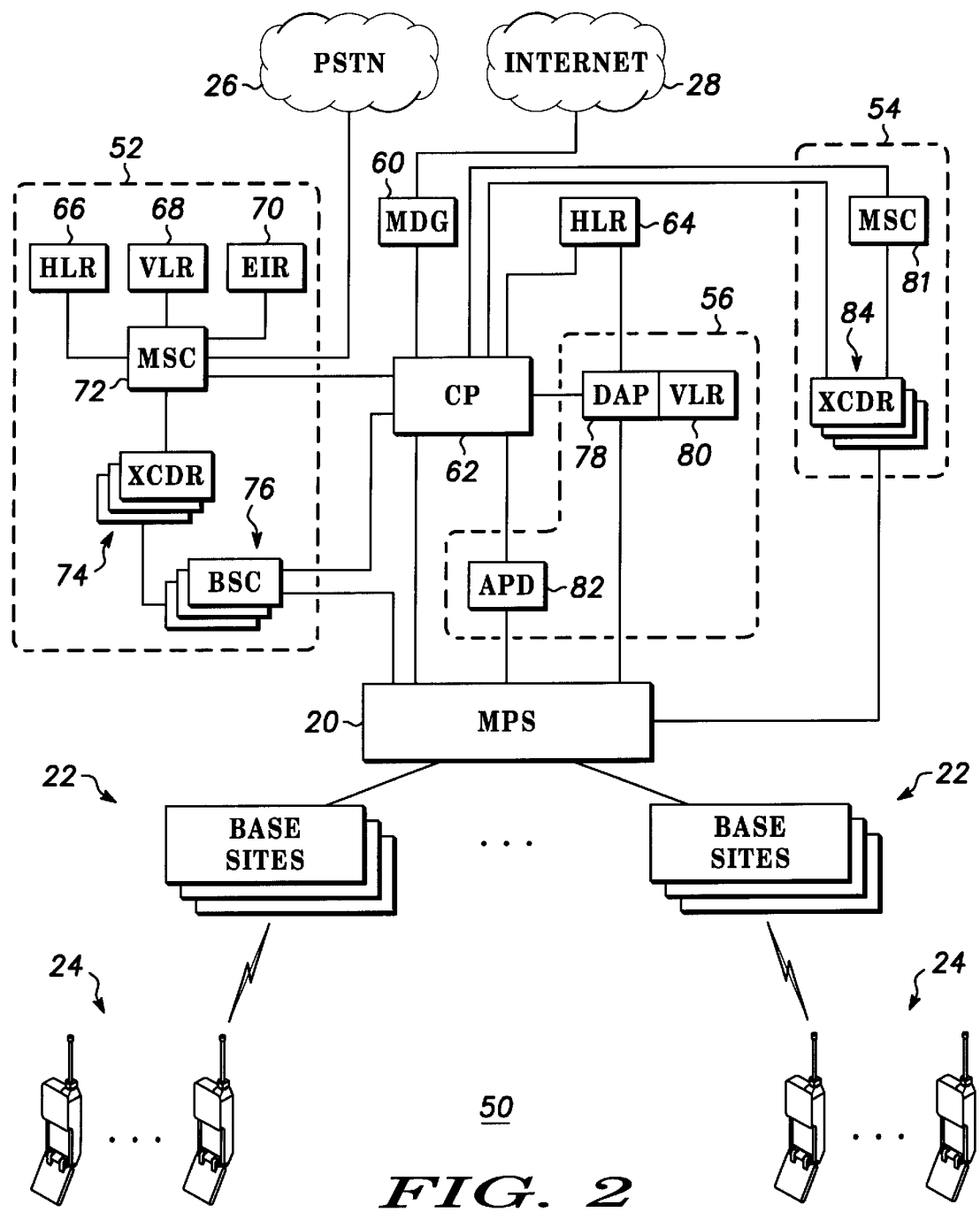
FIG. 2 is a block diagram illustrating an exemplary multi-service radio communication system in accordance with another embodiment of the present invention.

FIG. 2 illustrates a block diagram of an exemplary radio communication system 50 in accordance with another embodiment of the present invention. The system 50 includes a first interconnect system 52, a second interconnect subsystem 54, a dispatch subsystem 56, a stand alone home location register (HLR) 64, a call processor (CP) 62, a mobile data gateway (MDG) 60, the MPS 20, the base sites 22, and the MSUs 24. The system 50 integrates the interconnect, dispatch, and IP services described in connection with the system 10 of FIG. 1, as well as an additional interconnect service illustrated by the second interconnect subsystem 54. Accordingly, the system 50 can support multiple interconnect services, such as iDEN and GSM.

The first interconnect subsystem 52 includes a home location register (HLR) 66, a visitor location register (VLR) 68, an electronic ID register (EIR) 70, a mobile switching center (MSC) 72, a plurality of transcoders (XCDRs) 74 and a plurality of base site controllers (BSC) 76. The MSC 72 can include a DMS-MSC cellular telephone switch and the HLR 66 can include a DMS-HLR home location register, both of which are manufactured by Northern Telecom, Inc. The HLR 66 can include one or more databases or look-up tables and store MSU registrations and identifications (IDs) that associate system services with the respective MSUs. The BSCs 76 can include one or more iDEN base site controllers that are commercially available from Motorola, Inc. The XCDRs 74 includes voice processors and are commercially available from Motorola, Inc.

The dispatch subsystem 56 includes a dispatch application processor (DAP) 78, a visitor location register (VLR) 80, and an advanced packet duplicator (APD) 82. The functionalities of the DAP 78, VLR 80, and APD 82 are well known in the art. The DAP 78 can be an iDEN DAP commercially available from Motorola, Inc.

The second interconnect subsystem 54 includes an MSC 81 and one or more transcoders (XCDRs) 84 for providing interconnect services to a second mobile communication system, such as GSM.

The APD 82 can provide voice packet distribution for mobile-to-mobile interconnect calls.

The CP 62 provides a connection between the various subsystems. In addition, the CP 62 acts as an interface between the MSC 72 and BSC 76 in the first interconnect subsystem 52. This permits the CP 62 to intercept connect request messages being passed between the BSC 76 and MSC 72. By intercepting connection requests, the CP 62 can determine the statuses of target MSUs from the HLR 64, and then provide meaningful notification about the state of the target MSU without unnecessary paging.

The HLR 64 stores a database or look-up table of MSU statuses. The HLR database can be updated by either the CP 62 or DAP 78. By accessing the MSU statuses stored in the HLR 64, the CP 62 can provide inter-service notification of MSU statuses to conserve system resources.

Figure 3:
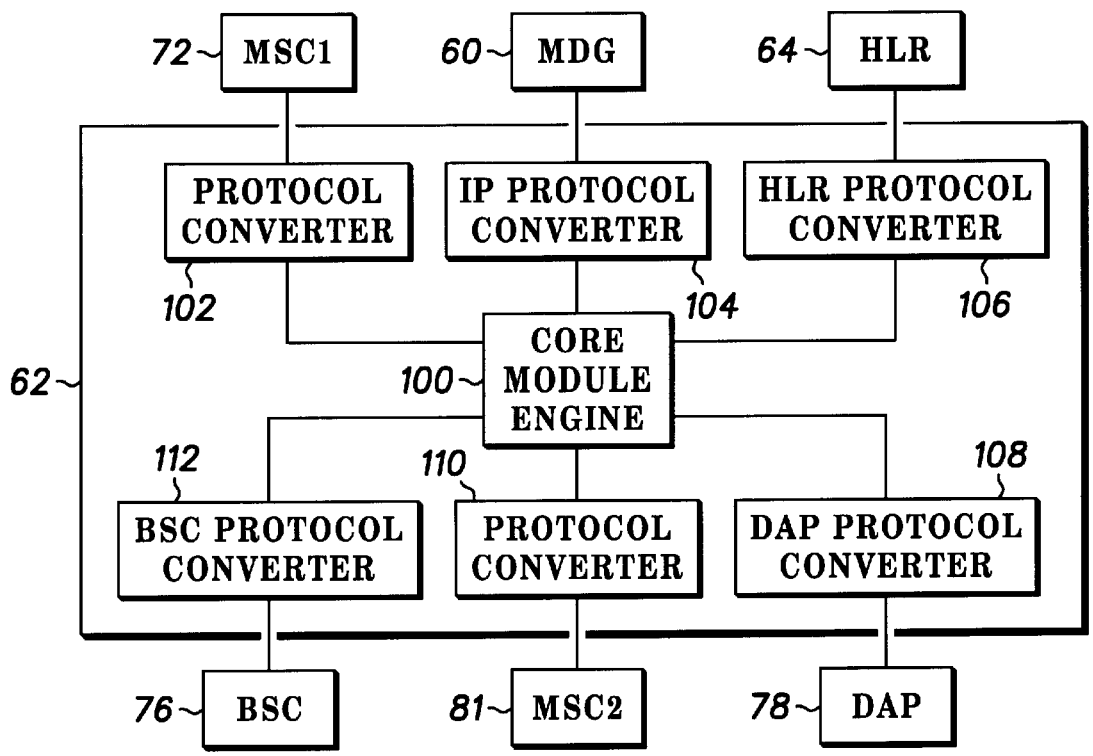
FIG. 3 is a block diagram illustrating details of the call processor shown in FIG. 2.

FIG. 3 is a block diagram showing details of the CP 62 shown in FIG. 2. The CP 62 includes a first interconnect protocol converter 102, an IP protocol converter 104, an HLR protocol converter 106, a DAP protocol converter 108, a second interconnect protocol converter 110, a BSC protocol converter 112, and a core module engine 100. Each of the protocol converters 102–112 provides an interface between the various subsystem components shown in FIG. 2 and the core module engine 100.

The core module engine 100 provides inter-service notification of MSU statuses by intercepting connection requests from the various subsystems and accessing status information stored in the HLR 64 based on MSU information included in the incoming requests. By accessing status information locally stored in the HLR 64, the core module engine 100 can provide inter-service call waiting functionality, improved system reliability, and shortened set-up time for mobile-to-mobile interconnect calls.

The CP 62 can be implemented using a commercially-available telecommunications grade having a multiple interface boards permitting it to communicate with the various subsystem components shown in FIG. 3 using standard protocols. The core module engine 100 and protocol converters 102–112 can be software routines or programs for providing the respective functionality described herein. The module engine 100 and protocol converters 102–112 can communicate with one another using a standard computer text format, such as ASCII.

The MSC1 protocol converter 102 can be configured to interface to a conventional, commercially-available MSC, such as a digital switch available from Northern Telecom, Inc., using public open standard protocol, such as the A protocol. Incoming connection requests from interconnect calls on the PSTN 26 can be translated by the converter 102 into a format usable by the core module engine 100, such as a computer file containing ASCII text. The connection requests can include a target subscriber ID or phone number, which is used by the module engine 100 to retrieve target subscriber status information from the HLR 64. This information can be transferred back to the caller through the MSC1 72, as well as be used by the module engine 100 to issue messages alerting the target subscriber.

The BSC protocol converter 112 interfaces to one or more commercially-available BSCs using a standard open protocol, such as A-bis. The module engine 100 can communicate with the BSC protocol converter 112 using text formatted data, such as ASCII. Through the converter 112, the module engine 100 can pass connection requests and monitor traffic loads and operation statuses of each BSC.

In this manner, the module engine can balance the traffic loads at each BSC, as well as alert the remaining subsystems when a BSC has failed.

The HLR protocol converter 106 can be a conventional TCP/IP interface for communicating with the HLR 64.

The MSC2 protocol converter 81 can be configured to interface with a GSM subsystem according to a standard open protocol.

Figure 4:
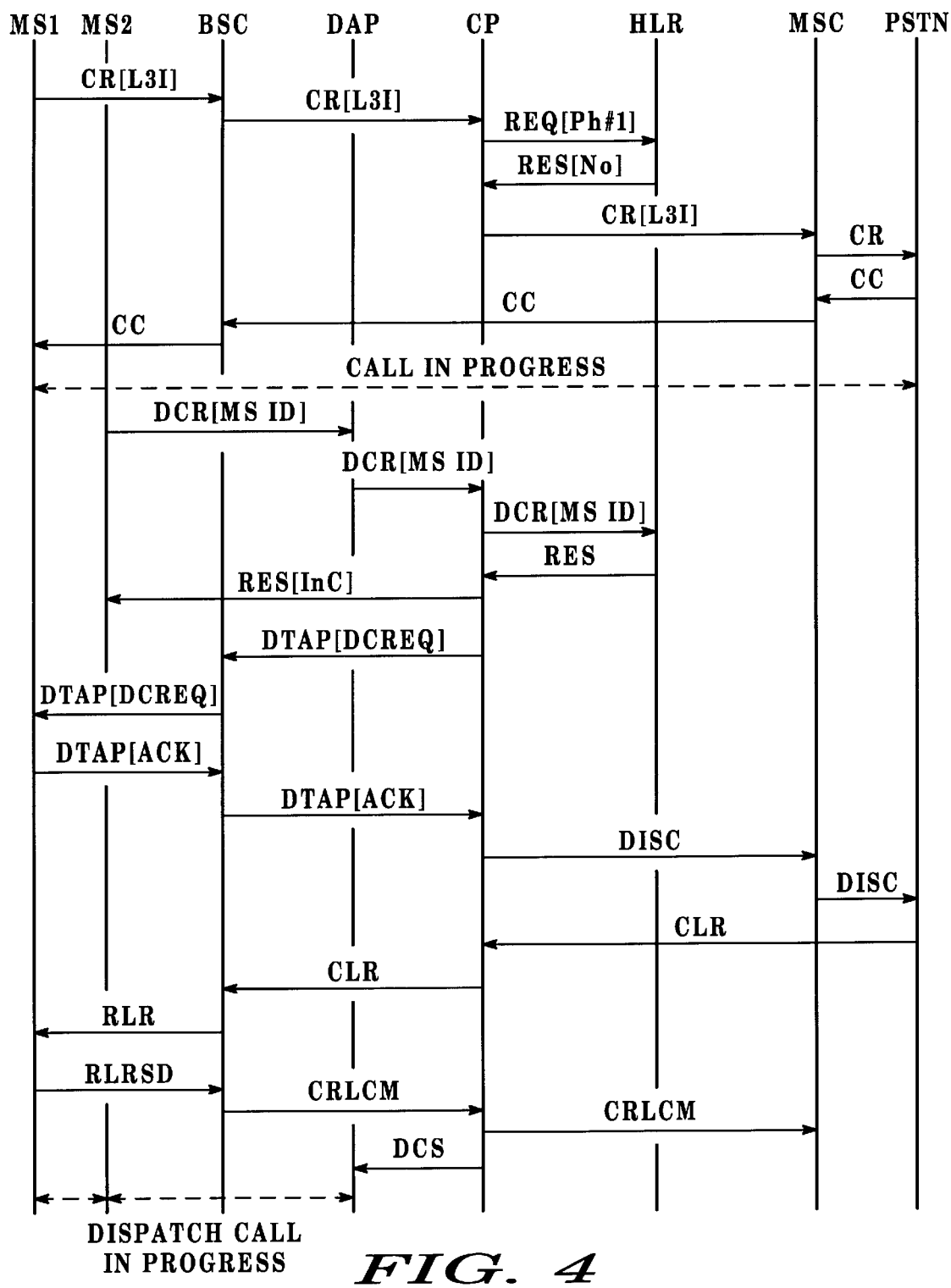
FIG. 4 shows a message sequence chart illustrating service switching from an interconnect call to a dispatch call.

FIG. 4 illustrates a message sequence chart showing service switching from an interconnect call to a dispatch call. The chart is read from top to bottom, and illustrates the sequence of messages passed between various components shown in the system 50 of FIG. 2 to establish an interconnect call, and then interrupt the interconnect call with an incoming dispatch call. This service switching procedure occurs as follows.

A connection request, containing layer three information (L3I) is transmitted from a first MSU (MS1) to one of the BSCs 76. In response, the BSC 76 transfers the L31 connection request (CR) to the call processor 62.

In response to the CR, the CP 62 requests a status check from the HLR 64. The request (REQ) includes the phone number (PH#) of the called party. The HLR 64 generates a response (RES) indicating that the called party is not registered in the system.

Upon receiving this response, the CP 62 generates a layer three connection request to the MSC 72, which in turn submits a connection request to the PSTN 26.

Upon successfully connecting to the called party, a connection confirm (CC) message is transmitted from the PSTN 26 to the MSC 72, and then to the CP 62 through the BSC 76, and finally to the first MSU (MS1). At this point, an interconnect call is established between MS1 and a non-subscriber party, on the PSTN 26.

After the interconnect call is established, a second subscriber (MS2) attempts to call the first subscriber (MS1), who is now involved in the interconnect call. To accomplish this, the second subscriber MSU generates a dispatch connection request (DCR) that includes the identification of the first MSU (MS ID). The DCR is transmitted to the DAP 78. In response, the DAP 78 transfers the DCR, including the MS ID to the CP 62. The CP 62 uses information contained in the DCR to query the HLR 64 to determine the status of MS1.

The HLR 64 generates a response (RES) that indicates that MS1 is currently involved in a interconnect call with another party. The CP 62 forwards this response to MS2 as an in-call notification (InC).

The CP 62 then sends a direct transfer application part (DTAP) message to the BSC 76 that contains a dispatch request (DSREQ). In turn, the BSC 76 transfers the DTAP to MS1 to notify the first subscriber that the second subscriber is attempting to reach him.

In response to receiving the dispatch request, the first subscriber (MS1) generates a DTAP acknowledge (ACK), which is transmitted to the BSC 76. The BSC 76 transfers the DTAP acknowledge to the CP 62, which in response generates a disconnect (DISC) message to the MSC 72.

The MSC 72 transfers the DISC message to the PSTN 26. The PSTN 26 then disconnects the interconnect call and returns a clear message (CLR) to the CP 62. The CP 62 forwards the CLR message to the BSC 76, which then sends a release radio channel message (RLR) to the first subscriber unit (MS1). The MS1 responds with a radio channel release complete message (RLRSD) that is submitted to the BSC 76.

In response, the BSC 76 generates a clear command complete message (CLRCM) which is transferred to the CP 62. The CP 62 then forwards the CRLCM to the MSC 72. The CP also sends a dispatch call set up (DCS) message to the DAP 78. In response to the DCS message, the DAP 78 proceeds to establish a dispatch call between MS2 and MS1. At this point, MS1 has successfully switched from the interconnect call to the dispatch call.

Figure 5:
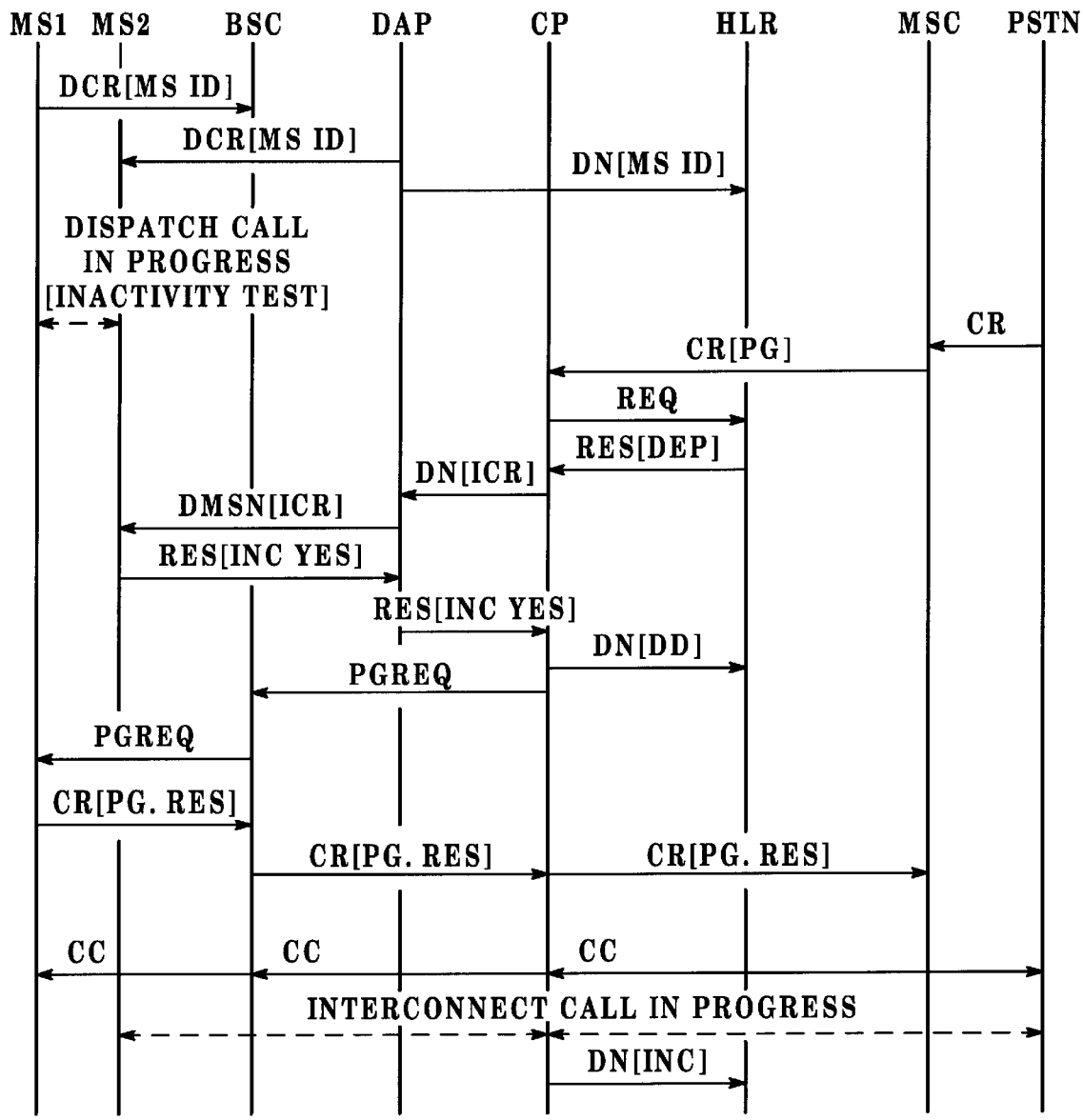
FIG. 5 shows a message sequence chart illustrating service switching from a dispatch call to an interconnect call.

FIG. 5 shows a message sequence chart illustrating service switching from a dispatch call to an interconnect call. Essentially, this chart illustrates the sequence of messages passed between the various system components shown in FIG. 2 to a establish a dispatch call between two MSUs, and then interrupt the dispatch call with an incoming interconnect call from the PSTN 26.

To establish the dispatch call, the first MSU (MS1) sends a dispatch connection request (DCR) to the DAP 78. The DCR includes the mobile subscriber unit ID (MS ID) of the target MSU.

In response to the DCR, the DAP 78 forwards the DCR to the target subscriber unit (MS2). After the target subscriber accepts the dispatch connection request, the DAP 78 transmits a DAP notification message (DN) to the HLR 64 to update the status of the called subscriber (MS2). The DN message includes the MS ID. At this point, a dispatch call is in progress between MS1 and MS2.

A connection request (CR) is then received by the MSC 72 from the PSTN 26. In response to the CR message, the MSC 72 generates a CR that includes a page request to the target mobile (PG). This CR is transferred from the MSC 72 to the CP 62.

Upon receiving the CR, the CP 62 generates a request message (REQ) to the HLR 64 to check the status of the called MSU (MS2). Upon receiving the REQ, the HLR 64 generates a response message (RES) to the CP 62 that indicates that the called MSU is currently involved in a dispatch call (DCP).

Upon receiving this response, CP 62 sends a DAP notification message (DN) to the DAP 78 indicating that it has an interconnect call request (ICR) directed to the second subscriber unit MS2. In response, the DAP 78 generates a dispatch mobile subscriber notification (DMSN) message that notifies MS2 of the incoming interconnect call.

Upon receiving the DMSN message, MS2 generates a response (RES) to the DAP 78 that indicates that MS2 wishes to switch from the dispatch call in progress to the incoming interconnect call. If the DAP 78 does not receive a response from MS2 within a predetermined time, the connection request (MSC) will be denied, and the incoming interconnect call terminated.

Assuming that a response is timely received from the MS2, the DAP 78 generates a response to the CP 62 indicating that the MS2 is willing to accept the incoming interconnect call. The CP 62 then generates a DN indicating a dispatch disconnect (DD) to the HLR 64.

The CP 62 then generates a page request message (PGREQ) to the BSC 76. The PGREQ is then transmitted from the BSC 76 to the target subscriber mobile (MS2).

In response to the PGREQ, MS2 generates a connection request (CR) to the BSC 76. The BSC 76 passes the CR to the CP 62, which in turn forwards the CR to the MSC 72. A connection confirm (CC) message is then transmitted from the PSTN 26 to the CP 62 and then to the BSC 76 and MS2. At this point, the interconnect call between the PSTN and target subscriber (MS2) is established. The CP 62 then notifies the HLR 64 with a message that updates the status of the MS2 to indicate that MS2 is now involved in an interconnect call (DN[lnc]).

While specific embodiments of the present invention have been shown and described, it will apparent to those skilled in the art that the disclosed invention may be modified in numerous ways and may assume many embodiments other than those specifically set out and described above.

Accordingly, the scope of the invention is indicated in the appended claims, and all changes that come within the meaning and range of equivalents are intended to be embraced therein.

What is claimed:

1. A radio communication system for providing communication services to a plurality of mobile stations, comprising:

an interconnect subsystem for providing interconnect services that allow the plurality of mobile stations to communicate by way of a public switched telephone network (PSTN);

a dispatch subsystem for providing dispatch services to the plurality of mobile stations; and a call processor, operatively coupled to the interconnect subsystem and the dispatch subsystem, for integrating the interconnect services and the dispatch services provided to the plurality of mobile stations, wherein integrating comprises providing at least one response directed to a source mobile radio communication unit in a first service mode that includes an indication that a target mobile radio communication unit is engaged in a call in a second service mode, wherein the first service mode and the second service mode are supported by different subsystems from the group comprising the interconnect subsystem and the dispatch subsystem.

2. The radio communication system of claim 1, further comprising:
a home location register (HLR), operatively coupled to the call processor, for storing status information of at least one of the plurality of mobile stations.

3. The radio communication system of claim 2, wherein the status information includes the current operational service mode of the at least one of the plurality of mobile stations.

4. The radio communication system of claim 2, wherein the call processor is configured to update the status information.

5. The radio communication system of claim 1, wherein the call processor includes at least one protocol converter.

6. The radio communication system of claim 1, wherein the call processor includes a TCP/IP gateway for providing access to the Internet.

7. The radio communication system of claim 1, wherein the interconnect subsystem includes a mobile service center (MSC) operatively coupled to the call processor.

8. The radio communication system of claim 1, wherein the interconnect subsystem includes a base station controller (BSC) operatively coupled to the call processor.

9. The radio communication system of claim 1, wherein the dispatch system includes a dispatch application processor (DAP) operatively coupled to the call processor.

10. The radio communication system of claim 9, wherein the DAP is capable of updating the status information stored in the HLR.

11. The radio communication system of claim 1, further comprising an Internet protocol (IP) subsystem, operatively coupled to the call processor, for providing Internet access to the plurality of mobile stations.

12. A system for providing communication services to a plurality of mobile radio communication units, each of the mobile radio communication units being capable of operating in a plurality of service modes, the system comprising:
a mobile switching center (MSC) for providing a communications link to a public switched telephone network (PSTN);
a base station controller (BSC);
a plurality of base sites, operatively coupled to the BSC, for providing trunking communication services to the mobile radio communication units;
a dispatch processor, operatively coupled to the base sites, for providing dispatch services to the mobile radio units;
a home location register (HLR) for storing service mode status information for the plurality of mobile radio communication units; and
a call processor, operatively coupled to the MSC, BSC, HLR, and dispatch processor, for providing at least one response to the MSC, BSC, and dispatch processor based on the service mode status information, wherein the at least one response is directed to a source mobile radio communication unit in a first service mode and includes an indication that a target mobile radio communication unit is engaged in a call in a second service mode.

13. The system of claim 12, wherein the call processor includes means for providing a communication link between the MSC and BSC.

14. The system of claim 12, wherein the call processor includes means for intercepting connection request messages for the BSC to the MSC.

15. The system of claim 12, wherein the call processor includes means for balancing the traffic between the BSC and the plurality of base sites.

16. The system of claim 12, wherein the call processor includes at least one protocol converter.

17. The system of claim 12, wherein the plurality of service modes includes a dispatch mode and an interconnect mode.

18. The system of claim 12, further comprising:
a packet duplicator, operatively coupled to the call processor and the dispatch processor, for providing dispatch service voice packets to the call processor.

19. The system of claim 18, wherein the call processor is configured to utilize the dispatch service voice packets for interconnect mode calls between the mobile radio communication units.

20. The system of claim 12, further comprising:
a mobile data gateway (MDG), operatively coupled to the call processor, for providing Internet services to the mobile radio communication units.

21. The system of claim 20, wherein the MDG is capable of updating the status information stored in the HLR.

* * * * *